United States Patent [19]

Kojima et al.

[11] Patent Number: 4,547,423

[45] Date of Patent: Oct. 15, 1985

[54] TEXTILE FOR CLOTHES

[75] Inventors: Akira Kojima, Machida; Saburo Yoshida, Atsugi; Yoshio Yamada; Seiji Shioda, both of Fukui; Kazumi Isoshima, Ootsu, all of Japan

[73] Assignees: Sony Corporation; Seiren Co., Ltd.; Asahi Kasei Kogyo Kabushiki Kaisha, all of Japan

[21] Appl. No.: 513,690

[22] Filed: Jul. 14, 1983

[30] Foreign Application Priority Data

Jul. 15, 1982 [JP] Japan ................. 57-123490

[51] Int. Cl.$^4$ ............... B32B 3/26; B32B 5/18
[52] U.S. Cl. ............... 428/315.5; 428/315.9; 428/317.9; 428/904; 428/922
[58] Field of Search ......... 428/315.5, 315.9, 317.9, 428/922

[56] References Cited

U.S. PATENT DOCUMENTS

| 3,486,968 | 12/1969 | Mateo | 428/315.5 |
| 3,645,775 | 2/1972 | Schulze | 428/315.5 |
| 3,663,266 | 5/1972 | Dye | 428/315.5 |
| 3,772,059 | 11/1973 | Shikada | 428/315.5 |
| 3,922,470 | 11/1975 | Amano et al. | 428/315.5 |
| 4,208,696 | 6/1980 | Lindsay et al. | 428/922 |
| 4,228,194 | 10/1980 | Meeder | 428/922 |
| 4,301,040 | 11/1981 | Berbeco | 428/317.9 |
| 4,429,000 | 1/1984 | Naka et al. | 428/286 |
| 4,505,973 | 3/1985 | Neet et al. | 428/317.9 |

Primary Examiner—James C. Cannon
Attorney, Agent, or Firm—Hill, Van Santen, Steadman & Simpson

[57] ABSTRACT

A material for clothes is disclosed which is formed of a base cloth and a porous film having a number of very fine pores and coated on at least one surface of the base cloth. In this case, the pores are made to have a diameter about 0.1 to 5 $\mu$m and the material has the percentage of dust permeation less than 50% for the dust with size larger than 0.3 $\mu$m and moisture permeability more than 2500 g/m$^2$/24 hrs.

11 Claims, 2 Drawing Figures

TEXTILE FOR CLOTHES

BACKGROUND OF THE INVENTION

1. Field of the Invention

The present invention relates generally to material for clothes suitable for use with, for example, working clothes with no dust, and more particularly is directed to material for clothes which can suppress dust permeation and which can improve air permeability upon wearing.

2. Description of the Prior Art

The recent progress of the manufacturing technology of semiconductors is remarkable and such semiconductor manufacturing technology tends to be more and more microscopic and high in density. In consequence, the manufacturing circumstance of VLSI (very large scale integration) using a microscopically fine working technology requires severer conditions. That is, the requirements not only for temperature and humidity but also dust, which floats in the working space or circuimstance become more and more severe. As regards the working space itself, the above requirements can almost be satisfied by using a proper filter and improving the facilities considering the ventilation, but no fundamental counter-measure is yet made against the problem of dusts generated from human being working in tne working space.

In the art, working clothes called dust-free clothes have been on market, the clothes consider only antistatic property against staticelectricity, namely, dust absorption property and dust generation property against the dusts coming out of the material for working clothes itself. However, no countermeasure is taken for suppressing the permeation of dusts generated from the inside of the working clothes, namely, man's skin, his underwears and so on.

OBJECTS AND SUMMARY OF THE INVENTION

Accordingly, it is an object of the present invention to provide an improved material for clothes which can obviate the above defects inherent in the conventional material for clothes.

Another object of the present invention is to provide material for clothes which of course takes the dust attraction and the dust generation from material for working clothes into consideration and which can suppress the permeation of dust generated from the inside of the working clothes.

A further objects of the present invention is to provide material for clothes which can improve air permeability upon wearing so that the working clothes can be prevented from being steamy and sticky by sweat.

A yet further object of the present invention is to provide a dust-free working clothes woven by cloth specially manufactured which can avoid the coming-out of dusts generated from the workers per se working in the working space with very strict working conditions against floating dusts, whereby it is expected that the yield of the VLSI can be improved and the air-conditioning expense can be reduced greatly.

According to one aspect of the present invention, there is provided a material for clothes which comprises; a base cloth; and a porous film having a number of very fine pores and coated on at least one surface of said base cloth, said pores being made to have a pore size as minute as 0.1 to 5 $\mu$m, said material having a percentage of dust permeation less than 50% for a dust with a size larger than 0.3 $\mu$m and moisture permeability more than 2500 g/m$^2$/24 hrs.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
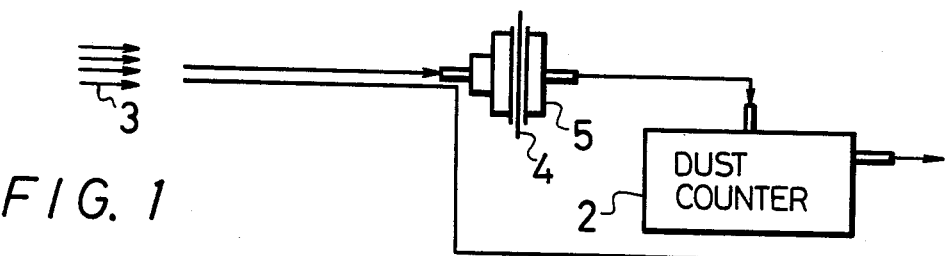
FIG. 1 is a systematic diagram useful for explaining a measuring method of percentage of dust permeation of material for clothes and so on according to the present invention.

Embodiments of the present invention will hereinafter be described in detail.

According to the present invention, a porous film or sheet having a number of very small pores with the diameter of 0.1 $\mu$m to 5 $\mu$m is coated on or laminated to at least one major surface of base cloth to prevent dust from being permeated or penetrated therethrough. In this case, average dust capturing ratio or percentage of dust larger than 0.3 $\mu$m in diameter can be made 50% or more. In addition, in order to improve the air permeability upon wearing the clothes, its moisture permeability is made more than 2500 g/m$^2$/24 hrs.

Also in the present invention, antistatic property can be given to the material for clothes, if necessary. In other words, for the purpose of preventing the semiconductor element from being destroyed by the electrification of staticelectricity generated from the friction of the working clothes upon working, also preventing attraction of dust suspended in the air caused by electrification of staticelectricity induced in the clothes, and further preventing dusts generated from the inside of the working clothes, namely, man's skin, his underwears and so on from coming out through clothes, such a cloth is employed as base cloth which has woven a antistatic yarn therein or in which a conductive material is blended into elastomer and this elastomer is applied to at least one surface of the cloth or antistatic agent is applied to at least one surface of the cloth so that the cloth is given with such a property that under the condition that temperature is 20° C. and humidity is 40%, the voltage caused by frictional electricity can be suppressed lower than 1000 V or more preferably lower than 500 V.

The above porous film with a pore size as minute as 0.1 $\mu$m to 5 $\mu$m is such one in which very small pores of circular, ellipse, square and like shapes formed through the porous film and having the minimum distance ranging from 0.1 $\mu$m to 5 $\mu$m between adjacent ones occupy more than 50% of the entire number of pores formed through the film. Such very small or fine pores each penetrate the film from its top to its bottom as set forth above.

As a method for forming the porous film of this invention on the cloth, there are methods as follows. One is to directly coat resin on cloth, and the other is to bond the porous film having already formed therethrough a number of fine or very small pores to the cloth. As the method for directly forming micropores on the cloth, there is a so-called wet coagulating method in which polar organic solvent solution mainly composed of polyurethane elastomer is coated on a base cloth as a coating liquid, and the base cloth is then introduced into a coagulation bath to thereby coagulate polyurethane elastomer thus the microporous structure being formed. The wet coagulating method includes the addition of a so-called pore size controlling agent, to the polyurethane solvent solution which is soluble to the coagulation bath so as to control the aperture size of pores. Further, the wet coagulating method includes another method in which calcium chloride-methanol solution mainly composed of polyamide elastomer is coated on the base cloth as a coating solution and then polyamide elastomer is coagulated to thereby form the microporous structure.

As the method to directly form the microporous film on the cloth there have been also proposed a so-called dry foaming method in which a foaming agent is added to the elastomer such as polyurethane, silicone, vinyl chloride or the like, the elastomer is coated on the base cloth and then this foaming agent is decomposed by the thermal treatment after coating to resultant gases such a carbon dioxide gas and so on into the elastomer to thereby form air pores therin and, a dry method by which polyamino acid is directly coated on the base cloth.

The manner to laminate microporous film according to the present invention to the cloth is carried out in such a manner that the microporous film fibrillated from, for example, polytetra-fluoroethylene, polyvinylidene fluoride and the like or the microporous film made from polyurethane and polyamide according to the wet coagulation method is coated with emulsion type or solvent type adhesive agent on its full surface or in line-pattern thereon and then bonded to the cloth.

The cloth referred to in the present invention means knitted or woven fabrics and nonwoven fabrics made of all textile materials, and it is desired that the cloth itself is made difficult not only to absorb dust but also to produce dust.

Of the cloths having microporous film thus made, such a cloth whose dust permeation preventing percentage against dust of more than 0.3 $\mu$m in size is more than 50% and whose moisture permeability is more than 2500 g/m$^2$/24 hrs can achieve the purpose as the material for working clothes according to the present invention.

In order to reduce the voltage caused by the frictional electricity of the cloth lower than 1000 V, it is preferable to use the cloth having woven therin antistatic yarns having high conductive property under the condition of low humidity such as stainless steel fiber and carbon-blended yarn or the cloth coated with the micoporous film which itself has the conductive property made by mixing the conductive material into the elastomer.

Moreover, depending upon the use of the cloth, it is possible that silicone or fluorocarbon type water-repellent agents is coated on at least one surface of the cloth of the present invention formed by coating or laminated the microporous film thereto so as to give the water-repellent property to the cloth. Furthermore, it is possible that the film made by the silicone elastomer dry foaming method and the film made by fibrillating the fluorocarbon film are formed on laminated to one surface of the cloth to improve chemical resistance thereof.

Subsequently, examples of the present invention will be described.

EXAMPLE 1

20 parts by weight of dimethyl formamide was added to 100 parts by weight of 30 weight % solution of polyester type polyurethane elastomer solution dissolved in dimethyl-formamide and then the mixture is stirred well. This mixed solution was coated on one surface of nylon-6 taffeta fabric (70 denier/68 filament both for warp and weft, total of warp and weft yarn count: 210/in) by a knife coater in such a manner that the coating amount thereof might become 20 g/m$^2$ in solid amount, the fabric coated with the mixture was immediately immersed in the water for 5 minutes for coagulation, immersed in the hot water at 60° C. for 10 minutes, squeezed by a mangle, dried at 120° C. for 3 minutes, and set at 150° C. for 1 minute for finishing.

EXAMPLE 2

On one surface of polyester twill fabric contained antistatic yarn (100 denier/48 filament both for warp and weft, warp yarn count; 122/in, weft yarn count; 103/in, for antistatic yarn, polyester spun yarn containing stainless steel fiber with a mixture rate of 3% has been woven as warp at pitch of 5 mm), the mixture solution was coated, coagulated, dried for finishing according to the same treatment and method as in the example 1.

EXAMPLE 3

100 parts by weight of 30 weight % solution of polyester type polyurethane elastomer dissolved into dimethyl formamide was added with 50 parts by weight of zinc oxide, and further 30 parts by weight of dimethyl formamide and then the mixture was stirred well. This mixed solution was coated on one surface of polyester twill fabric (100 denier/48 filament both for warp and weft, warp yarn count; 122/in, weft yarn count; 103/in) by a knife coater in such a manner that the coating amount thereof might become 20 g/m$^2$ in solid amount, the mixture was immediately immersed in the water for 5 minutes, for coagulation, and immersed in the hot water at 60° C. for 10 minutes, squeezed by the mangle, dried at 120° C. for 3 minutes, and set at 150° C. for one minute for finishing.

EXAMPLE 4

5 parts by weight of P—P' oxybisbenzene sulfonyl hydrazite and 0.2 parts by weight of zinc octylate (effective component was 10%) as catalyzer were added to 100 parts by weight of dimethyl hydrogen silicone polymer with the concentration of 25 weight % solved in perchloro etylene to thereby prepare a mixed solution. This mixed solution was coated on one surface of the polyester twill fabric having a antistatic yarn woven therinto shown in the example 2 by the knife coater in such a manner that the coating amount thereof might become 8 g/m$^2$ in solid amount, and they were immediately subjected to the thermal treatment at 0° C. for finishing.

EXAMPLE 5

Polyester type polyurethane elastomer which was dissolved into dimethyl formamide in 20 weight parts was coated on polypropylene-based releasing paper by a knife coater in such a manner that the film after being dried might become 10 $\mu$m in thickness, and then immediately dried at 120° C. for 3 minutes. Subsequently a mixed solution, which was provided by dissolving 100 parts by weight of polyester type two-part polyurethane polymer having moisture permeability and containing OH group as a terminal group into 25 parts by weight of toluene and by adding thereto 5 parts by weight isocyanate bridging agent (effective isocyanate component was 13%), was coated on the above film by a reverse roll coater in such a manner that the coating amount thereof after being dried might become 10 g/m$^2$, and then dried for 3 minutes. The film layer thus formed on the releasing paper and the polyester twill fabric having the antistatic yarn shown in the example 2 were pressed by a hot-roll at 80° C. and under the pressure of 1 kg/cm$^2$, laminate together, aged at normal temperature for two days, released from the releasing paper, set at 150° C. for one minute for finishing.

COMPARATIVE EXAMPLE

A cloth made of polyester twill fiber yarn having the antistatic yarn shown in the example 2, which was not yet subject to the working according to this invention, was employed as the comparative example.

Percentage of dust permeation, moisture permeability and voltage caused by frictional electricity of each of the above examples become as indicated on table 1. The table 1 also indicates percentage of dust permeation, moisture permeability and voltage by frictional electricity of the comparative example. From the table 1, it is clear that the material for clothes according to the present invention are superior in percentage of dust permeation and moisture permeability as compared with those of the prior art. Also, it is understood that antistatic electrification effect can be carried out.

TABLE 1

|  | Comparative Example | Examples | | | | |
| --- | --- | --- | --- | --- | --- | --- |
|  |  | 1. | 2. | 3. | 4. | 5. |
| Percentage of dust permeation | | | | | | |
| Dust larger than 0.3μ in size | 100 | 39.1 | 30.2 | 29.7 | 41.2 | 13.2 |
| Dust larger than 0.5μ in size | 100 | 26.4 | 22.5 | 21.3 | 29.1 | 8.7 |
| Dust larger than 1.0μ is size | 80.9 | 9.0 | 5.5 | 5.0 | 12.2 | 2.1 |
| Dust larger than 2.0μ in size | 75.0 | 4.7 | 2.0 | 1.7 | 7.6 | 0.1 |
| Moisture permeability (g/m$^2$/24 hrs) | 4,400 | 4,000 | 3,700 | 4,100 | 3,000 | 3,500 |
| Voltage caused by frictional electricity | | | | | | |
| Coated surface | 350 | 4,500 | 440 | 90 | 450 | 430 |
| Back surface of the coated surface | 340 | 4,000 | 400 | 230 | 420 | 230 |

The above moisture permeability and voltage caused by frictional electricity were respectively meansured according to JIS (the Japanese Industrial Standard) Z-0208 and JIS L-1094 (the temperature was 20° C. and the humidity was 40%). The percentage of dust permeation was measured by an apparatus shown in FIG. 1. In FIG. 1, reference numerals 1 and 2 respectively denote dust counters (optically scattering system dust counters). Sample air 3 is directly supplied to one dust counter 1. One the other hand, a sample cloth 4 is held by a sample holder 5 and the above sample air 3 is supplied through the sample cloth 4 to the other dust counter 2. In this case, the dust counter 1 counts the number of original dusts contained in the sample air 3, while the other dust counter 2 counts the number of dusts passed through the sample cloth 4. On the basis of the counted values by the dust counters 1 and 2, the percentage of dust permeation is calculated as:

$$\text{percentage of dust permeation} = \frac{\text{the number of dusts passed through the sample cloth 4}}{\text{the number of original dusts contained in the sample air 3}} \times 100\%$$

From the above equation, the dust capturing percentage can be obtained as follows:

$$\text{dust capturing percentage (\%)} = 100 - \text{percentage of dust permeation (\%)}$$

Furthermore, the average value was calculated from ten samples of the cloth.

Figure 2:
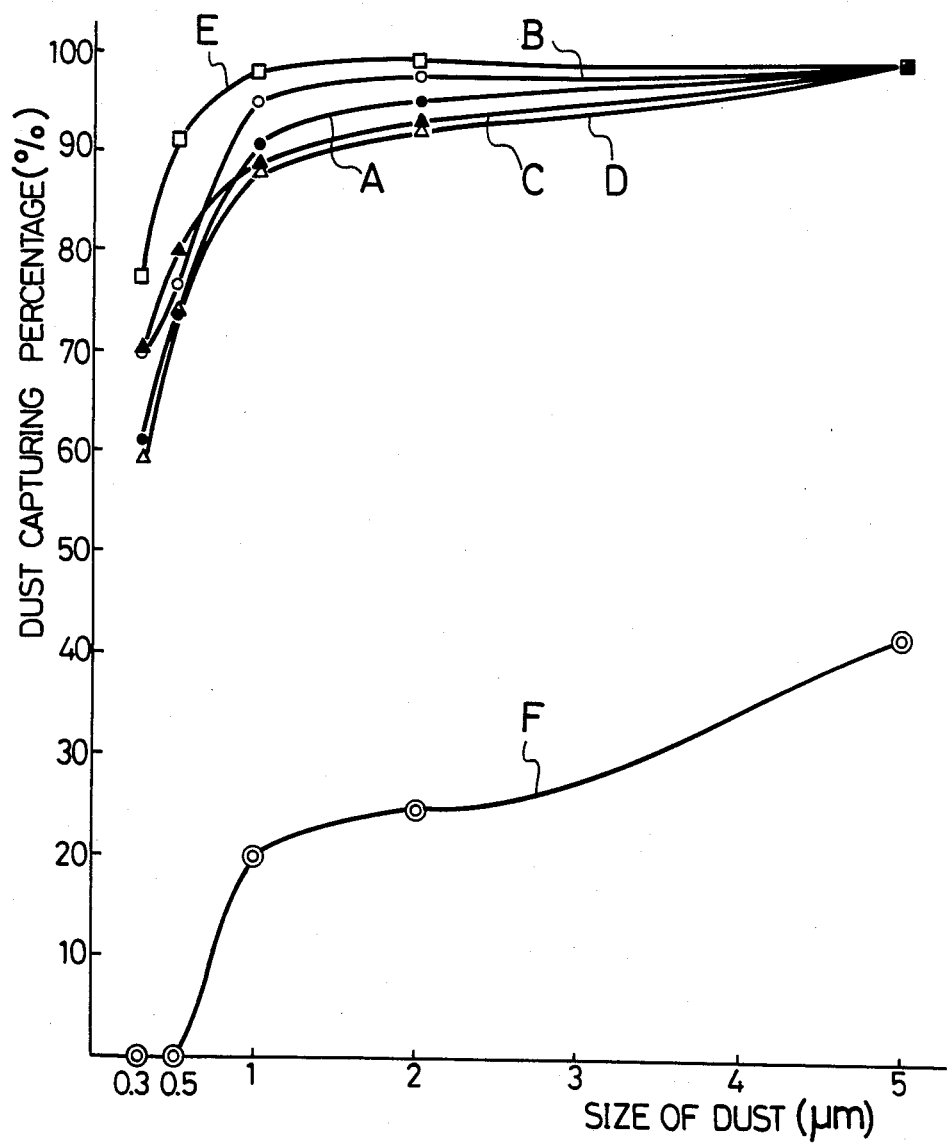
FIG. 2 is a graph showing dust capture percentage of the examples according to the present invention and a comparative example.

In order that the effect of the present invention may be understood more clearly, the dust capturing percentage of the examples and the comparative example are shown in a graph of FIG. 2. In the graph of FIG. 2, curves A, B, C, D and E respectively indicate the dust capturing percentages of the examples 1 to 5 of the invention, and a curve F indicates that of the comparative example.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:
1. A material for clothes comprising:
a base cloth; and
a porous film having a number of very fine pores and formed on at least one surface of said base cloth, said pores being made to have a diameter about 0.1 to 5 μm, said material having a percentage of dust permeation less than 50% for a dust with a size larger than 0.3 μm, a moisture permeability more than 2500 g/m$^2$/24 hrs, and having means incorporated therein for preventing said material from being electrically charged.

2. A material for clothes as claimed in claim 1, in the form of dust-free working wear.

3. A material for clothes as claimed in claim 1, wherein said means is a conductive yarn which is woven in said base cloth.

4. A material for clothes as claimed in claim 1, wherein said means is a conductive substance mixed into elastomer forming said porous film.

5. A material for clothes as claimed in claim 1, wherein said means is an antistatic agent which is coated on at least one surface of said base cloth.

6. A material for clothes as claimed in claim 1, wherein said material for clothes is provided with means for providing water-repellency.

7. A material for clothes as claimed in claim 6, wherein said means for providing water-repellency is coated on at least one surface of said base cloth.

8. A material for clothes as claimed in claim 6, wherein said means for providing water-repellency is coated on said porous film.

9. A material for clothes as claimed in claim 6, wherein said means for providing water-repellency is made of silicone water-repellent agent.

10. A material for clothes as claimed in claim 6, wherein said means for providing water-repellency is made of fluorine-based water-repellent agent.

11. A material for clothes according to claim 1 wherein said means is sufficient to suppress voltage caused by frictional electricity to below 1000 volts.

* * * * *